United States Patent [19]
Jamieson

[11] Patent Number: 5,746,485
[45] Date of Patent: May 5, 1998

[54] PENALTY BRAKE CIRCUIT FOR STRAIGHT AIR PIPE BRAKE CONTROL EQUIPMENT

[75] Inventor: Paul E. Jamieson, Greer, S.C.

[73] Assignee: Westinghouse Air Brake Company, Wilmerding, Pa.

[21] Appl. No.: 736,265

[22] Filed: Oct. 24, 1996

[51] Int. Cl.$^6$ ................................................. B60T 7/14
[52] U.S. Cl. ................................................. 303/19; 303/3
[58] Field of Search ..................... 303/3, 7, 9.69, 303/123, 124, 128, 22.6, 15, 20, 18, 190, 86

[56] References Cited

U.S. PATENT DOCUMENTS

| | | | |
|---|---|---|---|
| 3,845,991 | 11/1974 | Engle | 303/3 |
| 4,491,372 | 1/1985 | Walley | 303/18 |
| 4,525,011 | 6/1985 | Wilson | 303/19 |
| 4,598,953 | 7/1986 | Wood et al. | 303/3 |
| 4,626,039 | 12/1986 | Worbois | 303/19 |

*Primary Examiner*—Josie Ballato
*Attorney, Agent, or Firm*—James Ray & Associates

[57] ABSTRACT

A brake control apparatus that applies and releases the brakes of a rail vehicle generally according to changes in pressure occurring within a straight air pipe incorporates a penalty brake circuit. The brake apparatus includes a controlling device for initiating changes of pressure within the straight air pipe. The brake apparatus also includes a first mechanism for providing a service brake control pressure in accordance with a command for service braking and a second mechanism for providing an emergency brake control pressure in accordance with a command for emergency braking. The brake control apparatus further includes a standard check valve for conveying to a standard load valve the higher of the service and emergency brake control pressures received from the first and second mechanisms. The standard load valve effects operation of the brake apparatus in response to whichever of the brake control pressures is received from the standard check valve. The penalty brake circuit comprises a third mechanism for providing a penalty brake control pressure to the straight air pipe in response to a command for a penalty braking. The penalty brake control pressure is ultimately communicable to the standard load valve. The standard load valve can effect operation of the brakes also in response to the penalty brake control pressure.

10 Claims, 4 Drawing Sheets

PENALTY BRAKE CIRCUIT FOR STRAIGHT AIR PIPE BRAKE CONTROL EQUIPMENT

CROSS-REFERENCE TO RELATED APPLICATIONS

This application is related to copending applications Ser. Nos. 08/736,292 and 08/736,576, entitled Penalty Brake Scheme For Straight Air Pipe Brake Control Equipment and Penalty Brake Design For Straight Air Pipe Brake Control Equipment, respectively, both sharing the same filing date of the present application, Oct. 24, 1996. These patent applications are assigned to the assignee of the present invention, and their teachings are incorporated into the present document by reference.

FIELD OF THE INVENTION

The present invention generally relates to a system for electropneumatically controlling brakes on a train and, more particularly, is concerned with a penalty brake circuit for electropneumatic brake control systems on trains employed in passenger transit service.

BACKGROUND OF THE INVENTION

Railroad vehicles operating in passenger transit service generally employ such brake control systems to control the brakes of the rail vehicles. Conventional electropneumatic brake control systems typically feature an electronic brake control device and a cab station unit in each locomotive of the train. The brake control device situated in the lead locomotive of the train controls the overall operation of the brakes in response to numerous inputs received from various devices situated on the train. The cab station unit provides the brake control device with certain of these inputs including the positions of the brake handles. Such brake control systems also include a means, such as a keyboard, for inputting certain set-up parameters and other known inputs to the brake control device; a display for monitoring operation of the brake control system; a locomotive interface unit for connecting both electrical power and various known trainlines to the brake control system; and an electropneumatic operating unit having various valves and other known devices for controlling pressures in various known pneumatic trainlines and in various known reservoirs so as to control the brakes on each rail vehicle according to commands received from the brake control device.

Aside from passenger transit train applications, it should be apparent to persons skilled in the brake control art that the invention set forth below could also be incorporated into the electropneumatic brake control systems commonly used to control freight and other types of railway trains. Obvious modifications may be necessary, though, depending upon the specific application in which the present invention is employed.

It should be noted that the foregoing background information is provided to assist the reader in understanding the instant invention. Accordingly, any terms of art used herein are not intended to be limited to any particular narrow interpretation unless specifically stated otherwise in this document.

SUMMARY OF THE INVENTION

In a presently preferred embodiment, the present invention provides a penalty brake circuit for a rail vehicle having a brake control apparatus to apply and release the brakes of the rail vehicle generally according to changes in pressure occurring within a straight air pipe of the rail vehicle. The brake control apparatus includes a controlling means for initiating changes of pressure within the straight air pipe. The brake control apparatus also includes a first means for providing a service brake control pressure in accordance with a command for a service brake application and a second means for providing an emergency brake control pressure in accordance with a command for an emergency brake application. The brake control apparatus further includes a standard check valve means for conveying to a standard load valve means the higher of the service and emergency brake control pressures received from the first and second means. The standard load valve means effects operation of the brake control apparatus in response to whichever of the brake control pressures is received from the standard check valve means. The penalty brake circuit comprises a third means for providing a penalty brake control pressure to the straight air pipe in response to a command for a penalty brake application. The penalty brake control pressure is ultimately communicable to the standard load valve means. The standard load valve means can effect operation of the brakes also in response to the penalty brake control pressure.

OBJECTS OF THE INVENTION

It is, therefore, a primary object of the present invention to provide a penalty brake circuit for an electropneumatic brake control system.

Another object of the present invention is to provide a penalty brake circuit for an electropneumatic brake control system that would compel the brake control system to provide service braking pressure to the brake cylinders of all the rail vehicles through the straight air pipe.

Yet another object of the present invention is to provide a penalty brake circuit for an electropneumatic brake control system that would also permit emergency braking whether or not a penalty occurs.

In addition to the objects and advantages of the penalty brake circuit set forth above, various other objects and advantages will become more readily apparent to persons skilled in the brake control art from a reading of the detailed description section of this document. Such other objects and advantages will become particularly apparent when the detailed description is considered in conjunction with the attached drawings and with the appended claims.

DETAILED DESCRIPTION OF THE INVENTION

Figure 1:
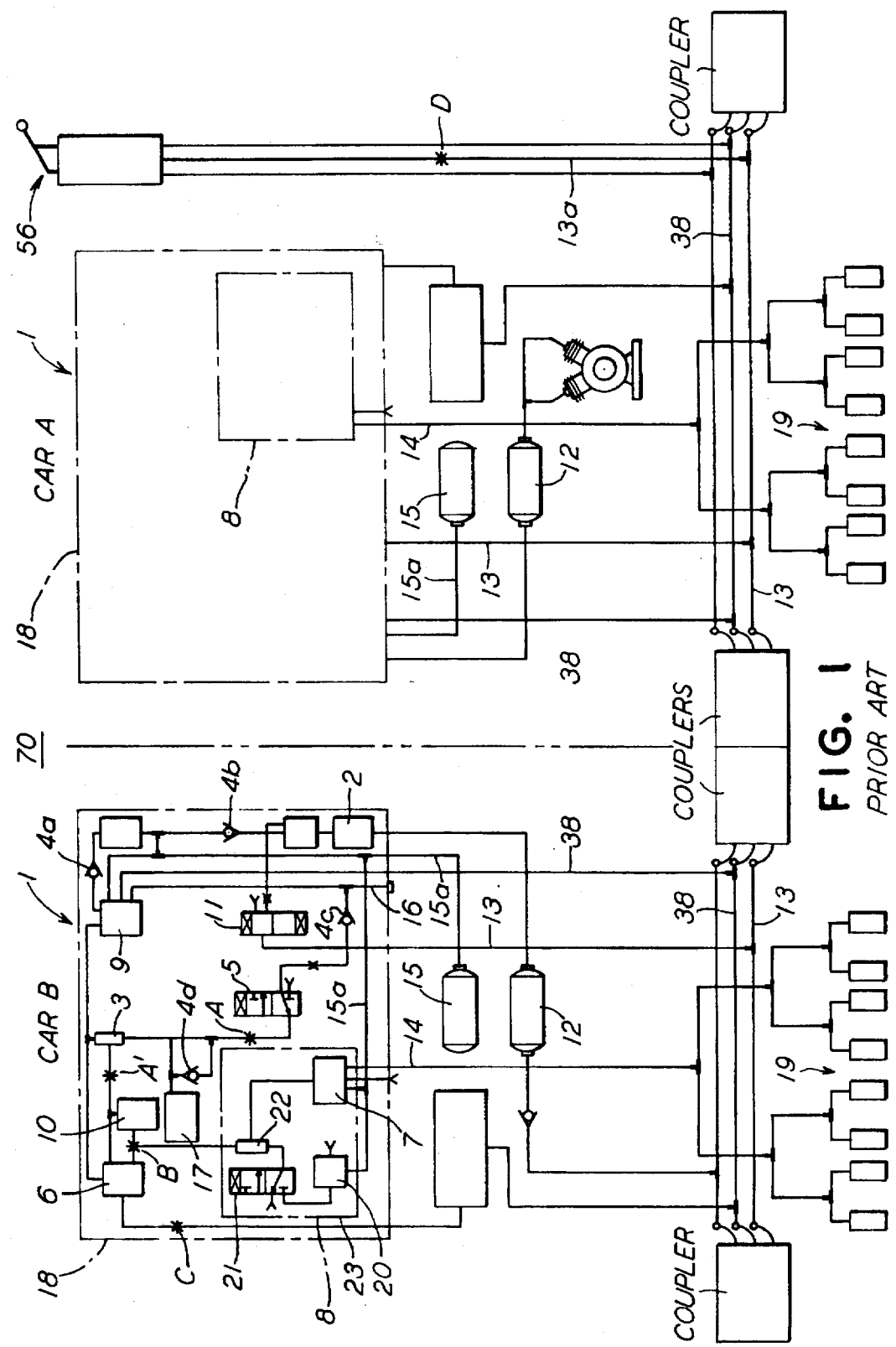
FIG. 1 is a schematic view of a prior art electropneumatic brake control system featuring an electropneumatic operating unit and a brake control device.
Figure 1B:
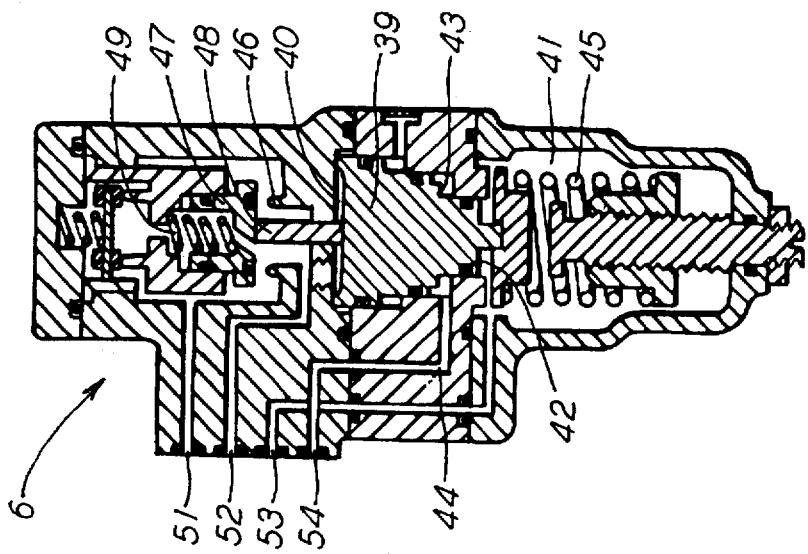
FIG. 1b is a partial diagrammatic view of a variable load valve device employed as part of the prior art electropneumatic operating unit.

Before describing the present invention in detail, for the sake of clarity and understanding, the reader is advised that identical components having identical functions in each of the accompanying drawings have been marked with the same reference numerals throughout each of the several Figures illustrated herein.

FIG. 1 illustrates conventional electropneumatic operating equipment used to direct flow of air to increase and decrease pressure within a brake cylinder line according to changes in pressure occurring within a straight air pipe (SAP) of a train. The changes in pressure occurring within the straight air pipe are typically initiated through a controlling device such as a C-3-E CINESTON® Controller manufactured by the Westinghouse Air Brake Company (WABCO). As is well known in the brake control art, such a controlling device typically provides control of both braking and propulsion. In a braking mode, such a controlling device not only controls the straight air pipe pressure but also the application and release trainlines. In a propulsion mode, it controls acceleration by energizing the propulsion control trainlines.

In response to the controlling device, typical electropneumatic equipment such as an E-2-S Operating Unit manufactured by WABCO, monitors the status of various trainlines and controls pressure within the brake cylinder line. The electropneumatic equipment also typically features control of inshot, dynamic brake, lock-out and snow brake functions.

The conventional electropneumatic operating equipment, generally designated 1, includes several devices of known construction and operation as is shown and explained in O & M Publication 4237-9, S.18 PTD, published by WABCO and incorporated herein by reference. Shown in FIG. 1 as part of the conventional electropneumatic equipment 1 are the usual devices including an air filter device 2, a double check valve device 3, several check valve devices 4a–4d, a lockout (FA-4) magnet valve device 5, a variable load valve device 6, a J-1 relay valve device 7, a snow brake device 8, an emergency valve device 9, a bypass valve device 10, and an N-4-E magnet valve device 11. These devices are typically mounted to a pipe bracket 18. The pipe bracket 18 includes internal passages that interconnect the devices and various fittings to which pneumatic piping from the rail vehicle attach.

Air filter device 2 removes dirt, moisture and most other suspended particulates from the air received from a main reservoir 12. This prevents such contaminants from entering the passages and devices of electropneumatic operating unit 1. Air filter device 2 may also include a drain valve through which to manually drain condensate from air filter device 2.

Double check valve device 3 has two inlets and a common outlet. a first inlet receives pressure from emergency valve 9 and a second inlet receives pressure from lockout magnet valve 5. Whichever of these two pressures is the greater pressure, double check valve 3 directs it through the common outlet to both variable load valve device 6 and bypass valve device 10. During brake applications, variable load valve 6 limits the pressure ultimately provided to a control port of relay valve 7 from the straight air pipe (SAP) 13 in direct proportion to pressure it receives from the air springs (not shown) of the rail vehicle. Through variable load valve 6, the electropneumatic equipment 1 can generate a brake cylinder line 14 pressure that accounts for the weight of the load borne by the rail vehicle. If the air spring pressure is lost, variable load valve 6 will direct a brake cylinder control pressure to the control port of relay valve 7 that is representative of the maximum (AW0) load of an empty rail vehicle. In addition to compensating for varying load weights, variable load valve 6 also allows the electropneumatic equipment 1 to deliver higher air pressure to brake cylinder line 14 following application of the emergency brake as set forth more fully below.

Each of the check valve devices 4a–4d are used to prevent the flow of air from one line back to another line. A charging check valve 4a prevents air from flowing from the volume of emergency valve 9 back to a supply reservoir 15. A supply check valve 4b prevents air from flowing from supply reservoir 15 if the pressure in a feed valve line 16 ever drops to a value below that in supply reservoir 15. A magnet pilot supply check valve 4c permits a rail vehicle to be "hauled dead" in a train by allowing straight air pipe 13 to charge feed valve line 16 if the pressure is greater in the former as compared to the latter. A blending volume check valve 4d prevents air from flowing from a blending volume 17 so as to allow chokes located in the passages of pipe bracket 18 to provide for a slow controlled blowdown of air pressure in that volume.

When snow brake device 8 is activated and the brakes are released and operating normally, snow brake device 8 enables relay valve 7 to deliver very low pressure to the brake cylinders, generally designated 19, such that the brakes are very lightly applied without any significant braking occurring. The friction generated by this light application of the brakes produces heat of sufficient degree to prevent ice and snow from accumulating between the brake shoe(s) and wheel tread(s).

Snow brake device 8 includes an N-Type reducing valve device 20, a snow brake magnet valve device 21 and a double check valve device 22 each of which is mounted to a filling piece 23. Filling piece 23 in turn mounts to pipe bracket 18 of the electropneumatic equipment 1. Reducing valve 20 reduces the pressure received from supply reservoir 15 to a pressure of lesser magnitude. The extent of the pressure drop depends on the setting of an adjustable control spring (not shown) contained within reducing valve 20. When snow brake device 8 is activated and the brakes are released and operating normally, snow brake magnet valve 21 is energized in which state it allows pressure to flow from reducing valve 20 to double check valve 22. Assuming that the pressure from variable load valve 6 is lower than the pressure from snow brake magnet valve 21, double check valve 22 directs the higher pressure to relay valve 7. Controlled in this instance by the pressure received at its control port from double check valve 22, relay valve 7 delivers from supply reservoir 15 very low pressure to the brake cylinders 19 such that the brakes are very lightly applied as indicated previously. Conversely, when snow brake device 8 is deactivated, snow brake magnet valve 21 is deenergized in which state it allows no pressure to flow from reducing valve 20 to double check valve 22. When the pressure from variable load valve 6 is higher than the zero pressure from snow brake magnet valve 21, double check valve 22 directs the higher pressure to relay valve 7. Controlled in this instance by the pressure received at its control port from variable load valve 6, relay valve 7 delivers pressure from supply reservoir 15 to the brake cylinders 19 as more fully set forth below.

Figure 1A:
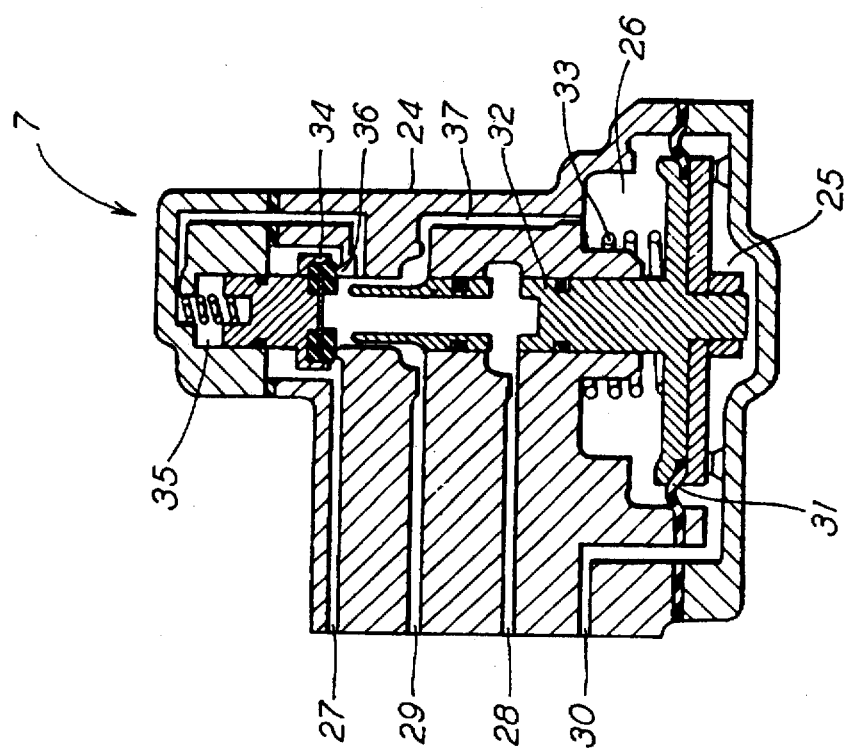
FIG 1a is a partial diagrammatic view of a J-1 relay valve device employed as part of the prior art electropneumatic operating unit.

Relay valve device 7 as illustrated in FIG. 1a includes a valve body 24 that defines a piston bore, a first control chamber 25, a second control chamber 26, a supply port 27 connected to supply reservoir 15, an exhaust port 28 connected to atmosphere, a delivery port 29 connected to brake cylinder line 14, and a control port 30 connecting the outlet of double check valve 22 to the first control chamber 25. Relay valve device 7 also features a diaphragm assembly 31 separating the first and second control chambers 25 and 26, a piston valve stem 32 connected to the second control chamber side of the diaphragm assembly 31, and a control spring 33 for biasing diaphragm assembly 31 in an exhaust state in which brake cylinder line 14 communicates with exhaust port 28. Relay valve device 7 also includes a check valve 34 at one end of the piston bore and a valve spring 35 for biasing check valve 34 closed against a check valve seat 36 so as to cutoff supply port 27 from any of the other ports of relay valve 7.

Relay valve device 7 either directs pressure to or exhausts pressure from brake cylinder line 14 according to the pressure received at diaphragm assembly 31 and the pressure within brake cylinder line 14. In particular, when the brake cylinder control pressure at control port 30 increases to a predetermined value, diaphragm assembly 31 and attached valve stem 32 move from their seat against control spring 33. As the pressure increases and valve stem 32 moves towards check valve 34, valve stem 32 initially cuts off communication between brake cylinder line 14 and exhaust port 28. Valve stem 32 then lifts check valve 34 from check valve seat 36 thereby permitting flow of air from supply reservoir 15 through supply port 27 and piston bore to brake cylinder line 14. Brake cylinder line 14 is also in communication with second control chamber 26 through the piston bore and a side passage 37. Consequently, as pressure develops in brake cylinder line 14, pressure also develops in second control chamber 26. The increase of pressure in second control chamber 26 eventually opposes the movement of diaphragm assembly 31 and valve stem 32. When the pressure across diaphragm assembly 31 equalizes, valve stem 32 is positioned to allow check valve 34 to seat thereby putting relay valve 7 in a lap state in which both the exhaust and supply ports 28 and 27 are cutoff from brake cylinder line 14.

Relay valve device 7 maintains pressure within brake cylinder line 14 while pressure from control port 30 remains on diaphragm assembly 31. Specifically, if the pressure within brake cylinder line 14 drops, the pressure within second control chamber 26 drops in kind and valve stem 32 will move to open check valve 34. Pressure will then flow from supply reservoir 15 through supply port 27 and piston bore to both brake cylinder line 14 and second control chamber 26 until the pressure across diaphragm assembly 31 again equalizes at which point relay valve 7 again assumes the lap state. When the brake cylinder control pressure at control port 30 decreases and pressure within first control chamber 25 drops correspondingly, however, valve stem 32 moves away from check valve 34 and eventually to the point where valve stem 32 assumes the exhaust state in which the pressure within brake cylinder line 14 flows to atmosphere through exhaust port 28.

The N-4-E magnet valve device 11 is a double solenoid type valve that serves as the application and release magnet valves in the electropneumatic equipment 1. It is generally through these valves that normal service brake operation is achieved. Specifically, in response to electrical signals initiated at the controlling device, the N-4-E magnet valve 11 directs pressure into or vents pressure from straight air pipe 13 so as to control pressure at control port 30 of relay valve 7 via lockout magnet valve device 5. When the application and release magnet valves of the N-4-E magnet valve device 11 are energized and deenergized, respectively, the application magnet valve directs pressure from feed valve line 16 and/or main reservoir 12 to straight air pipe 13. Charging of straight air pipe 13 ceases when the application valve is deenergized. When the release and application magnet valves are energized and deenergized, respectively, the release magnet valve vents pressure from straight air pipe 13 to atmosphere. When straight air pipe 13 is vented, the pressure supplied from the N-4-E magnet valve 11 to control port 30 of relay valve 7 is also vented. Notwithstanding, of course, any pressure ultimately delivered from either snow brake device 8 or emergency valve device 9 to control port 30 of relay valve 7, as the pressure supplied from the N-4-E magnet valve 11 to control port 30 of relay valve 7 is reduced so is the pressure within brake cylinder line 14. Relay valve 7 thus assumes the exhaust state in which the pressure within brake cylinder line 14 flows to atmosphere. When both the application and release magnet valves are deenergized, the N-4-E magnet valve 11 assumes a lap state in which straight air pipe 13 is cutoff from both feed valve line 16 and/or main reservoir 12 and exhaust port of the N-4-E magnet valve 11.

Lockout magnet valve device 5 is a known single coil device through which dynamic braking is taken into account by the electropneumatic equipment 1 via an electrical signal typically supplied by the supplier of the propulsion equipment. Lockout magnet valve 5 includes a first port connected to the second inlet of double check valve 3 and a second port interconnected with straight air pipe 13. When dynamic braking is activated, the electrical signal energizes lockout magnet valve 5 thereby cutting off communication between the first and second ports of lockout magnet valve 5. Lockout magnet valve 5 then prevents pressure in straight air pipe 13 from reaching control port 30 of relay valve 7. When dynamic braking is deactivated, lockout magnet valve 5 is deenergized thereby permitting communication between the first and second ports. Lockout magnet valve 5 then allows pressure in straight air pipe 13 to flow towards control port 30 of relay valve 7.

Emergency valve device 9 is a diaphragm operated device such as the one shown and described in O & M Publication 4237-45, published by WABCO and incorporated herein by reference. When activated in an emergency, emergency valve device 9 directs pressure from supply reservoir 15 to both double check valve 3 and variable load valve 6. As the pressure from emergency valve 9 is higher than the pressure from the N-4-E magnet valve 11 during an emergency, double check valve 3 directs the higher pressure to variable load valve 6. As explained previously, variable load valve 6 directs this higher pressure to control port 30 of relay valve 7. During an emergency brake application, the application magnet valve of the N-4-E magnet valve device 11 is also energized thereby directing pressure from feed valve line 16 and/or main reservoir 12 to straight air pipe 13. This pressure then flows through lockout magnet valve 5 to double check valve 3. Thus, during an emergency, the electropneumatic operating equipment 1 directs pressure from several routes to control port 30 of relay valve 7 so as to supply maximum pressure from supply reservoir 15 and/or main reservoir 12 to the brake cylinder lines. Emergency valve device 9 provides emergency application of the brakes during emergency situations and automatically during initial charging. It also maintains pressure within brake pipe 38 during normal service brake operation.

Variable load valve device 6, such as the one shown and described in O & M Publication 4229-1, S.21, published by WABCO and incorporated herein by reference, includes a valve body that defines a large piston bore and a small piston bore. Housed within the large piston bore is a step piston 39 generally disposed between an upper chamber 40 and a lower chamber 41. Step piston 39 near its lower end features a lower step 42 abutting lower chamber 41 and near its middle features a middle step 43 abutting an intermediate chamber 44. On the lower side of lower chamber 41 is an adjustable control spring assembly 45. Step piston 39 also has protruding from its upper end a plunger 46. Housed within the small piston bore is a small piston 47 disposed above upper chamber 40 and having a base for contacting both plunger 46 and an upper valve seat 48. On the other side of the base of small piston 47 is a second control spring assembly 49. The valve body also defines a first port 51 connected to the common outlet of double check valve 3, a second port 52 connected to both bypass valve device 10 and one inlet of double check valve 22, a third port 53 in communication with lower chamber 41 and connected to receive pressure from the air spring(s) of the rail vehicle, and a fourth port 54 in communication with intermediate chamber 44 and connected to emergency valve device 9.

Air spring pressure received via third port 53 into lower chamber 41 combined with the force of adjustable control spring assembly 45 collectively bias step piston 39 so as to unseat small piston 47 off of upper valve seat 48 via plunger 46. This permits pressure to flow from double check valve 3 through first port 51 into both second port 52 and upper chamber 40. When the pressure in both second port 52 and upper chamber 40 attains a value generally greater than the force corresponding to this collective bias, second control spring assembly 49 overcomes the collective bias thereby permitting small piston 47 to push against plunger 46 and move toward upper valve seat 48. When the base of small piston 47 seats against upper valve seat 48, flow of pressure between first 51 and second 52 ports is cutoff. Through such pneumatic control, the pressure ultimately conveyed to control port 30 of relay valve 7 via second port 52 is in direct proportion to the pressure variable load valve 6 receives from the air springs.

Variable load valve 6 thus provides a means to obtain a relatively constant rate at which a vehicle can be braked under varying loads.

Bypass valve device 10, such as the one shown and described in O & M Publication 4237-65, published by WABCO and incorporated herein by reference, includes an input port connected to both the common outlet of double check valve 3 and the first port 51 of variable load valve 51, an output port interconnected to both the second port 52 of variable load valve 6 and via double check valve 22 the control port 30 of relay valve 7, a piston, and an adjustable spring assembly for biasing the piston so that the input and output ports are in communication with one another. The bias spring assembly is adjusted so that as the pressure at the input port exceeds a preset value, the piston moves to cutoff communication between the input and output ports. This limits the pressure issued from the output port to a predetermined value based on the setting of the bias spring assembly. The bypass valve 10 is thus used to build up to a predetermined value the pressure ultimately sent to control port 30 of relay valve 7 if variable load valve device 6 malfunctions.

FIG. 1 also illustrates the controlling device, generally designated 56, that initiates the changes in pressure within straight air pipe 13. It is according to these changes that the electropneumatic operating equipment 1 directs flow of air to increase and decrease pressure within brake cylinder line 14 to apply and release the brakes of the rail vehicles. The controlling device 56 pneumatically connects directly to straight air pipe 13 so as to achieve this control.

Figure 2:
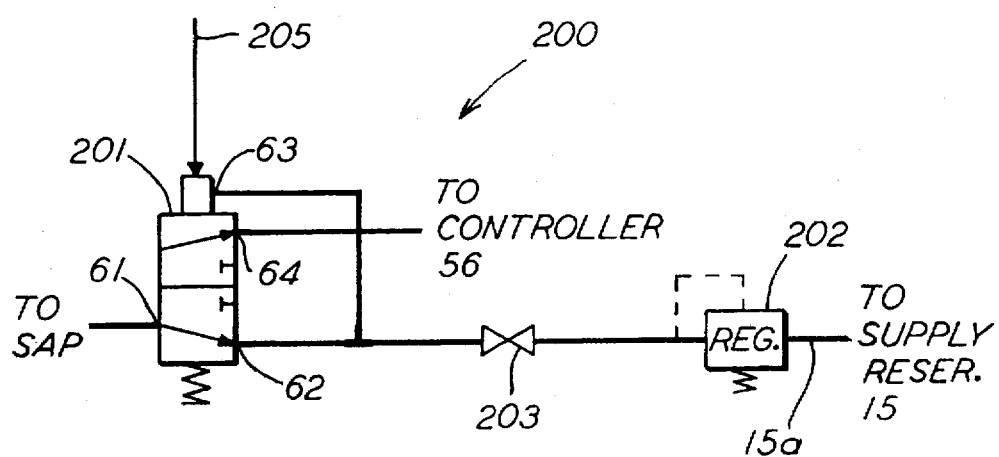
FIG. 2 is a schematic diagram of a penalty brake circuit according to the present invention for incorporation into an electropneumatic brake control system.
Figure 2A:
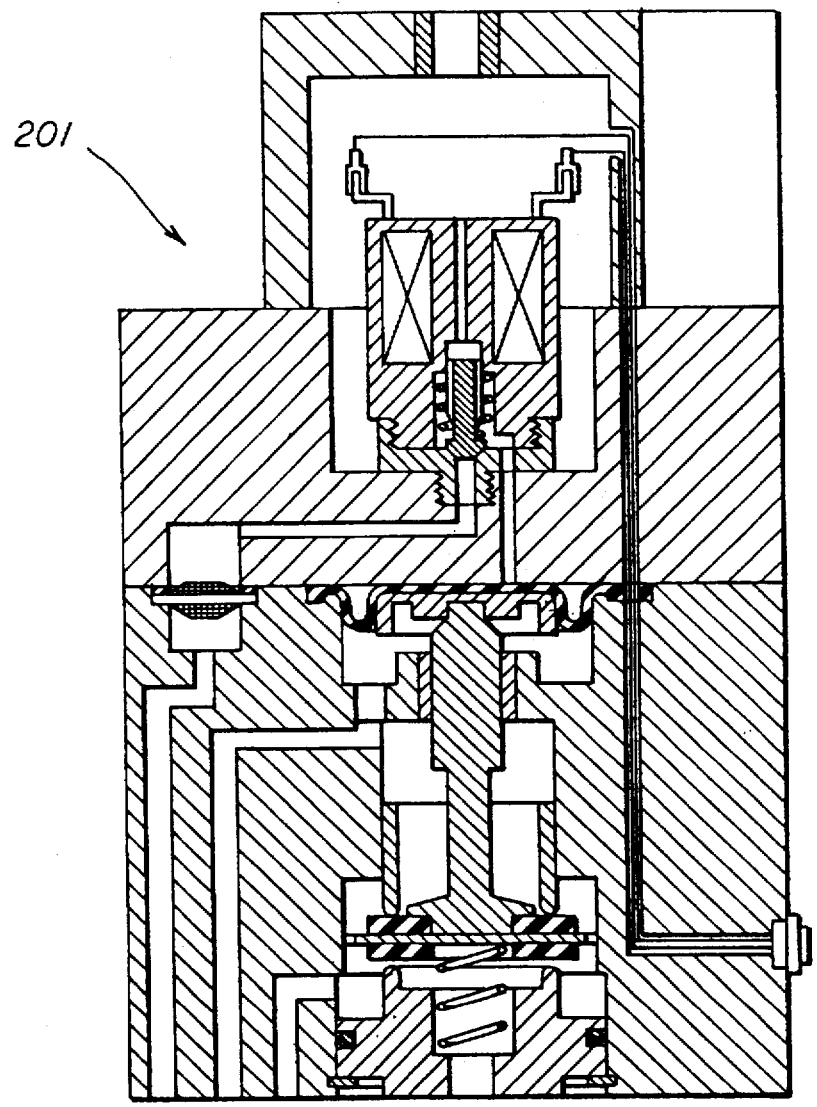
FIG. 2a is a partial diagrammatic view of a transfer valve device employed as part of the penalty brake circuit of FIG. 2.

Referring now to FIG. 2, illustrated therein are the essential details of a presently preferred embodiment of a penalty brake circuit for conventional electropneumatic brake control systems such as those which include the E-2-S Operating Unit and the C-3-E CINESTON® Controller manufactured by WABCO. By incorporating the penalty brake circuit of FIG. 2 into the electropneumatic control system of FIG. 1, a control system so equipped becomes capable of supplying pressure to the brake cylinders when a penalty of one or more known and predesignated types occurs. The penalty brake circuit, generally designated 200, includes a transfer valve device 201 and a regulating valve device 202.

The penalty brake circuit 200 is preferably incorporated into the electropneumatic control system, generally designated 70, as shown in FIG. 2 with reference to FIG. 1. Basically, the penalty brake circuit 200 preferably connects within the electropneumatic control system 70 at pipe 15a that connects to supply reservoir 15 and at junction "D" into pipe 13a that connects to straight air pipe 13. Specifically, at junction "D" shown in FIG. 1, transfer valve device 201 at a first port 61 thereof connects to straight air pipe 13 via pipe 13a and at a fourth port 64 thereof connects to the straight air pipe input of the controlling device 56. The regulating valve device 202 at a supply port thereof connects to pipe 15a and at a delivery port thereof connects to a second port 62 and a third port 63 of transfer valve 201.

Transfer valve device 201 may be a known device such as an R-5-D Transfer Valve as is shown and explained in O & M Publication 4237-70, S.44, published by WABCO and incorporated herein by reference. As shown in FIG. 2b, the transfer valve 201 is an air piloted, normally open, single solenoid type valve. The transfer valve 201 is the device through which control system 70 takes into account such penalty via an electrical signal whose absence indicates that the penalty has occurred. This electrical signal is conveyed to transfer valve 201 by an electrical line 205. During the absence of a penalty, the electrical signal continuously energizes transfer valve 201. While transfer valve 201 is energized, first port 61 communicates with fourth port 64 but is cutoff from second port 62. Consequently, the controlling device 56 is placed in communication with and controls the pressure within straight air pipe 13 through first and fourth ports 61 and 64 of transfer valve 201 and pipe 13a. This also prevents pressure in supply reservoir 15 from flowing through second port 62 to first port 61 as is clear by reference to FIGS. 1 and 2.

Absent a penalty, the electropneumatic control system 70 will therefore operate either in a normal service braking mode via N-4-E magnet valve device 11 or in an emergency braking mode via emergency valve device 9. In the normal service braking mode, the N-4-E magnet valve device 11 through its application magnet valve directs pressure from feed valve line 16 and/or main reservoir 12 to straight air pipe 13. Double check valve 3 experiences a higher pressure at its second inlet than at its first inlet. While this pressure difference between the second and first inlets exists, double check valve 3 allows this higher pressure to flow from the N-4-E magnet valve 11 through its second inlet to first port 51 of variable load valve 6. As described previously, through variable load valve 6, the pressure ultimately conveyed to control port 30 of relay valve 7 via second port 52 is in direct proportion to the pressure that variable load valve 6 receives from the air springs. Controlled in this manner absent a penalty by the pressure conveyed from the N-4-E magnet valve 11 via double check valve 3 and variable load valve 6, relay valve 7 delivers service braking pressure from supply reservoir 15 to the brake cylinders 19. In the emergency braking mode, emergency valve device 9 directs pressure from supply reservoir 15 to both the first inlet of double check valve 3 and the fourth port 54 of variable load valve 6. While this pressure difference between the first and second inlets exists, double check valve 3 allows this higher pressure to flow from emergency valve 9 to the first port 51 of variable load valve 6. Its operation further hastened by the pressure received at its fourth port 54, variable load valve 6 quickly directs this higher pressure via double check valve 22 to control port 30 of relay valve 7 as described previously. Consequently, during the absence of a penalty, the electropneumatic control system 70 basically behaves as if the penalty brake circuit 200 were not a part of control system 70.

When a penalty occurs, the electropneumatic control system 70 will generally operate either in a penalty braking mode via transfer valve device 201 or in an emergency braking mode via emergency valve device 9. (A request for normal service braking can also be made through N-4-E magnet valve 11 and delivered to relay valve 7 via double check valve 3 and variable load valve 6.) The control system 70 operates in the penalty braking mode while there is no emergency. When a penalty occurs, the electrical signal ceases thereby causing transfer valve 201 to deenergize. While transfer valve 201 is deenergized, first port 61 communicates with second port 62 but is cutoff from fourth port 64. Consequently, the controlling device 56 is cutoff from straight air pipe 13, and pressure from supply reservoir 15 flows through regulating valve 202 through second and first ports 62 and 61 of transfer valve 201 to pressurize straight air pipe 13 as is clear by reference to FIGS. 1, 2 and 2b. During this penalty braking mode, the pressure that is delivered from supply reservoir 15 to straight air pipe 13 via transfer valve 201 is basically that required for full service brake application. The penalty brake circuit 200 thus uses straight air pipe 13 to transmit this pneumatic penalty brake signal to the electropneumatic equipment 1 on each rail vehicle so as to apply the brakes when a penalty occurs.

Whether or not there is a penalty, in an emergency the emergency valve device 9 directs pressure from the supply reservoir 15 to both the first inlet of double check valve 3 and the fourth port 54 of variable load valve 6. While this pressure difference between the first and second inlets exists, double check valve 3 allows this higher pressure to flow from emergency valve 9 to the first port 51 of variable load valve 6. Its operation further hastened by the pressure received at its fourth port 54, variable load valve 6 quickly directs this higher pressure to the first inlet of double check valve 22. Double check valve 22 in turn conveys this higher pressure to control port 30 of the relay valve 7 as described previously. Controlled in this manner during the emergency braking mode of operation, relay valve 7 delivers pressure from the supply reservoir 15 to the brake cylinders 19 at an emergency rate.

The penalty brake circuit 200 also includes a cutout valve device 203 such as a sealed cutout cock connected between second port 62 of transfer valve 201 and the delivery port of regulating valve 202. If transfer valve 201 fails, cutout valve device 203 can be used to cutoff the flow of pressure from supply reservoir 15 to transfer valve 201. Cutout valve device 203 can thus be used to disable the function of penalty brake circuit 200. While the function of penalty brake circuit 200 is disabled, the brake control apparatus 70 can still operate in the service and emergency braking modes.

The penalty brake circuit 200 can be not only provided as part of new electropneumatic control system designs but also retrofitted into existing ones such as electropneumatic control system 70 manufactured by WABCO. In the latter, pipe 13a between controlling device 56 and straight air pipe 13 would need to be modified to accommodate transfer valve device 201 and the other devices of penalty brake circuit 200.

It should be apparent from FIGS. 1 and 2 that the penalty brake circuit 200 would need to be incorporated only into the locomotives or cab rail vehicles of the train unless dynamic braking is deactivated in the rail vehicles. If dynamic braking were deactivated in each of the rail vehicles, there would be no way to communicate the pneumatic penalty brake signal via the straight air pipe 13 to the electropneumatic equipment 1 on each rail vehicle. This circuit arrangement allows dynamic braking to function on the railcars/locomotives which may not be considered safe by the operating authority. It should also be apparent that the penalty brake circuit 200 could be incorporated into the electropneumatic control system 70 using any one of several other alternative schemes rather than the configuration described above.

While the presently preferred embodiment for carrying out the instant penalty brake circuit has been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit any of the following claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A penalty brake circuit for a rail vehicle having a brake control apparatus to apply and release the brakes of said rail vehicle generally according to changes in pressure occurring within a straight air pipe of said rail vehicle, said brake control apparatus including a controlling means for initiating changes of pressure within said straight air pipe, a first means for providing a service brake control pressure in accordance with a command for a service brake application, a second means for providing an emergency brake control pressure in accordance with a command for an emergency brake application, a standard check valve means for conveying the higher of said service and said emergency brake control pressures received from said first means and said second means, and a standard load valve means for effecting operation of said brake control apparatus in response to whichever of said brake control pressures is received from said standard check valve means, said penalty brake circuit comprising:

(a) a third means for providing to said straight air pipe in response to a command for a penalty brake application a penalty brake control pressure that is ultimately communicable to said standard load valve means so that said standard load valve means can effect operation of the brakes also in response to said penalty brake control pressure.

2. The penalty brake circuit as recited in claim 1 wherein said third means includes a transfer valve means that is normally energized absent receipt of said command for said penalty brake application thereby preventing communication between a source of said penalty brake control pressure and said straight air pipe while allowing communication between said controlling means and said straight air pipe and deenergized upon receipt of said command for said penalty brake application thereby allowing communication between said source of said penalty brake control pressure and said straight air pipe while preventing communication between said controlling means and said straight air pipe.

3. The penalty brake circuit as recited in claim 2 wherein said third means further includes a regulating valve means connected between said source of said penalty brake control pressure and said transfer valve means for regulating flow of said penalty brake control pressure to said transfer valve means.

4. The penalty brake circuit as recited in claim 3 wherein said third means further includes a cutout valve means connected between said regulating valve means and said transfer valve means for allowing flow of pressurized air therebetween to be cutoff so as to disable function of said penalty brake circuit.

5. The penalty brake circuit as recited in claim 4 wherein said cutout valve means is a sealed cutout cock device.

6. The penalty brake circuit as recited in claim 2 wherein said source of said penalty brake control pressure is a supply reservoir.

7. The penalty brake circuit as recited in claim 2 wherein said transfer valve means is a R-5-D type valve device.

8. The penalty brake circuit as recited in claim 2 wherein said third means further includes a cutout valve means connected between said source of said penalty brake control pressure and said transfer valve means for allowing flow of pressurized air therebetween to be cutoff so as to disable function of said penalty brake circuit.

9. The penalty brake circuit as recited in claim 8 wherein said cutout valve means is a sealed cutout cock device.

10. The penalty brake circuit as recited in claim 1 wherein said standard load valve means is a variable load valve device that upon receiving any one of said brake control pressures provides a brake cylinder control pressure that is proportional to pressure that said variable load valve device receives from air springs of said rail vehicle so that the weight of the load borne by said rail vehicle is taken into account during brake application.

* * * * *